Figure 1:
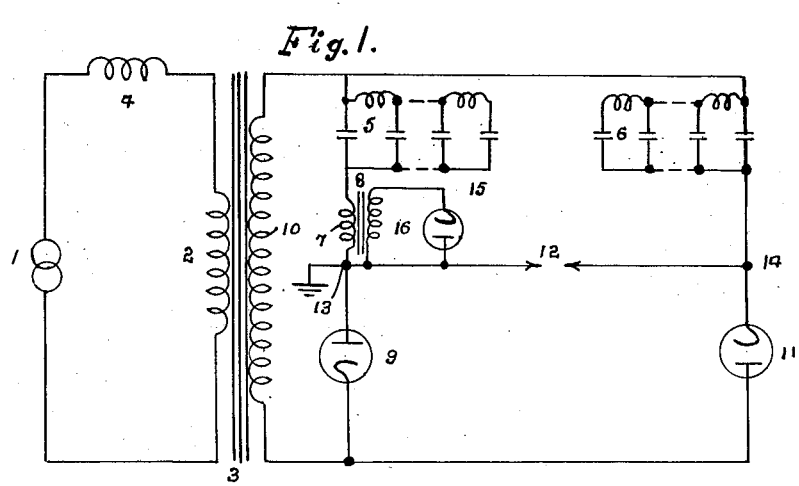

Feb. 12, 1952   W. M. MICHAELIS   2,585,817
APPARATUS FOR GENERATING REPEATED ELECTRIC PULSES
Filed Jan. 18, 1945

INVENTOR
WOLFGANG MICHAEL MICHAELIS
BY
ATTORNEY

Patented Feb. 12, 1952

2,585,817

UNITED STATES PATENT OFFICE 2,585,817

APPARATUS FOR GENERATING REPEATED ELECTRIC PULSES

Wolfgang Michael Michaelis, London, England, assignor to The General Electric Company Limited, London, England Application January 18, 1945, Serial No. 573,435
In Great Britain December 31, 1943

Section 1, Public Law 690, August 8, 1946
Patent expires December 31, 1963

14 Claims. (Cl. 171—97)

This invention relates to apparatus for generating electrical pulses of the type comprising (1) an alternating-potential supply means, such as an A. C. generator, yielding an approximately or exactly sinusoidal voltage of frequency $f=1/T_1$, (2) an energy-storage device charged by this potential usually through a step-up supply transformer, during part of the cycle of the generator, and (3) a switch which discharges the energy-storage device through a load at a determinate point in the cycle terminating or subsequent to the said part. In this description of the type of apparatus to which the present invention relates, an "energy-storage device" means an element whose input or terminal impedance is substantially that of a lumped capacitance at the said frequency $f$. While the storage devices may take the form of conventional condensers, they frequently are provided by transmission lines consisting of or equivalent to a set of series inductors with shunt capacitors, and characterised by a definite time $T_2$ necessary for a disturbance to travel from one end of the line to the other. $T_2$ is often small compared with $T_1$ and determines the duration of the generated pulse, while $T_1$ determines the repetition frequency or time separation of successive pulses.

The object of this invention is to improve such apparatus, especially in respect of one or more of the following features: The power factor of the load on the generator; the reduction of the D. C. component of the charging current through certain inductive elements involved in the apparatus; and the avoidance of dangerously high voltages if the switch fails to operate normally in certain respects.

In accordance with the present invention, apparatus for generating electrical pulses comprises two branch circuits connected in parallel and individually including a unidirectional conductive device in series with an energy-storage device the terminal impedance of which is predominantly capacitive at a given operating frequency. The two unidirectional conductive devices are oppositely poled in the branch circuits. The apparatus has inductive means associated with the branch circuits and providing for each of the storage devices a charging circuit. The apparatus further includes means for applying an alternating potential of the aforesaid given frequency to the charging circuits as well as switch means for connecting the storage devices in series-aiding relation and providing a discharge path therefor. Finally, the apparatus includes means responsive to the discharging of the storage devices for supplying output pulses to a utilizing device.

The utilizing device or load to which a generated pulse is to be applied is normally connected to the secondary winding of a load transformer one terminal of which is preferably earthed. The primary of the load transformer may be arranged either (a) in one of the branch circuits between the energy-storage device thereof and the point of connections of the switch thereto, or (b) in the connection between the two storage devices on the sides thereof remote from said points of connection of the switch. The position (a) enables one terminal of the switch to be earthed and position (b) enables one terminal of the A. C. generator, or of the secondary winding of the supply transformer, to be earthed.

Figure 2:
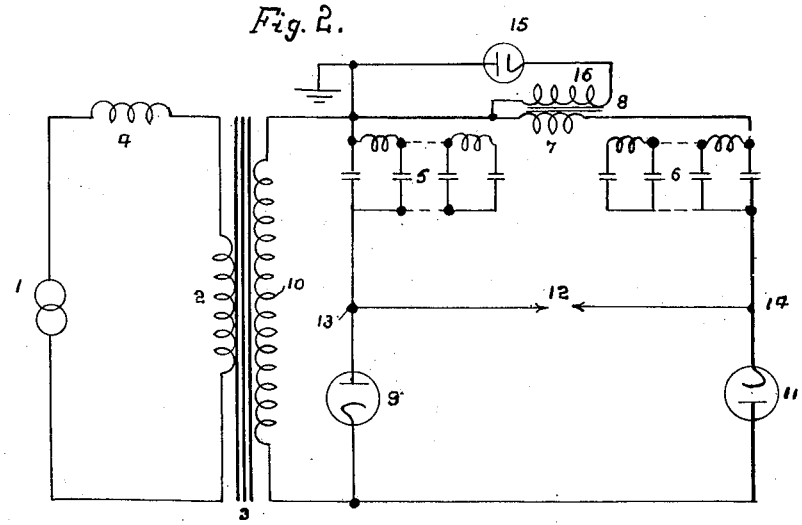

The invention will be described by way of example with reference to the accompanying drawing in which Fig. 1 is a circuit diagram illustrating a preferred form of the invention and Fig. 2 is a modification of the circuit of Fig. 1.

Referring to Fig. 1, an A. C. generator 1 comprises means for supplying an alternating potential of frequency $f$ to charging circuits for a pair of energy-storage devices 5 and 6 to be described presently. To that end, the output terminals of generator 1 are connected to inductive means associated with parallel-arranged branch circuits and providing therethrough a charging circuit for each device 5 and 6. More specifically, the generator is coupled to the primary 2 of a transformer 3 through a charging inductor 4, chosen so as to resonate with each of the storage devices 5 and 6 through the transformer 3 at the operating frequency $f$ of the generator.

The energy-storage devices 5 and 6 are simulated transmission line sections each of which has series-connected inductors and intermediate shunt-connected condensers, as is well understood to those skilled in the art. The parameters of each line are selected to present a predominantly capacitive terminal impedance at the frequency $f$. Line section 5, in series with the primary 7 of the load transformer 8 and with the unidirectional conductive diode 9 adapted to pass current flowing downwards in the figure, is connected across the terminals of the secondary 10 of the transformer 3 and forms one of the branch circuits mentioned above. The other branch circuit includes line section 6 in series with the unidirectional conductive diode 11 adapted to pass current flowing upwards in the figure. These branch circuits are connected in parallel to winding 10 of transformer 3. The switch means 12 when closed makes a conducting path between the point 13, between the primary 7 and the diode 9, and the point 14 between the line section 6 and the diode 11. This path constitutes a discharging circuit in which line sections 5 and 6 are included in series-aiding relation. The load 15 is connected across the terminals of the secondary 16 of the load transformer 8 the latter comprising means responsive to the discharge of the line sections for supplying output pulses to a load or utilizing device.

The operation of the arrangement is roughly as follows, starting from the instant at which the upper end of the secondary 10 becomes positive relative to the lower end thereof. During the first half cycle of the alternating potential supplied by generator 1, the condensers of line section 5 are charged through the diode 9 to a peak potential $V_c$, which is approximately $n(\pi)/2) v_0$, where $v_0$ is the peak potential across the generator 1, and $n$ is the step-up ratio of the transformer 3. During the next half cycle of the alternating potential, the condensers of line section 6 are charged to the potential $V_c$ through the diode 11. The potential between the points 13, 14 is now $2V_c$. When the switch 12 is closed at the end of a full cycle of the alternating potential, the discharge path for line sections 5 and 6 is completed and they discharge rapidly. Due to this discharge, the potential between points 13 and 14 falls to zero and a pulse of voltage is delivered from transformer 8 to load 15. The output pulse has a duration $2T_2$ and amplitude $V_c$ (assuming that the load is matched to the characteristic impedance of the line sections across the primary 7 of the load transformer 8). Thereafter the process begins again. The switch 12, as above pointed out, operates synchronously with the alternating-current supply. Since the potential difference between the points 13, 14 may be relatively large, the switch 12 may conveniently take the form of a rotary spark gap synchronized with the generator 1.

Referring to Fig. 2, in which like parts are given the same references as in Fig. 1, the primary 7 of the load transformer 8 is here arranged in the connection between the line sections 5 and 6 on the sides thereof remote from the points 13 and 14 to which the switch 12 is connected. In other respects the circuit of Fig. 2 is identical with that of Fig. 1 and its mode of operation is the same.

The inductance 4 may in either figure be arranged in series with the secondary winding 10 instead of in the primary circuit of the supply transformer. In that case it is so disposed that the charging currents to both branches 5, 9 and 6, 11 flow therethrough. Alternatively the leakage inductance of the transformer may be arranged to supply the whole or a part of the inductance which resonates with the line sections 5 and 6 at the frequency $f$.

In both figures, the current drawn from the generator 1 is nearly proportional to and in phase with the voltage across it; the load factor is therefore high. There is no appreciable D. C. component of the charging current through the transformer 3 and charging inductor 4. If the switch 12 fails to close and complete a discharge path for the energy-storage devices 5 and 6, further cycles produce no further increase in the potentials across the energy-storage devices which, at the end of the first full cycle of the alternating potential supplied by generator 1, are as highly charged as they ever can be.

I claim:

1. Apparatus for generating electrical pulses comprising, two branch circuits connected in parallel and individually including a unidirectional conductive device in series with an energy-storage device the terminal impedance of which is predominantly capacitive at a given operating frequency, said two unidirectional devices being oppositely poled in said circuits, inductive means associated with said branch circuits and providing for each of said storage devices a charging circuit, means for applying an alternating potential of said frequency to said charging circuits, switching means for connecting said storage devices in series-aiding relation and providing a discharge path therefor, and means responsive to the discharging of said storage devices for supplying output pulses to a utilizing device.

2. Apparatus for generating electrical pulses comprising, two branch circuits connected in parallel and individually including a unidirectional conductive device in series with an energy-storage device the terminal impedance of which is predominantly capacitive at a given operating frequency, said two unidirectional devices being oppositely poled in said circuits, inductive means associated with said branch circuits and providing for each of said storage devices a charging circuit which is resonant at said operating frequency, means for applying an alternating potential of said frequency to said charging circuits, switching means for connecting said storage devices in series-aiding relation and providing a discharge path therefor, and means responsive to the discharging of said storage devices for supplying output pulses to a utilizing device.

3. Apparatus for generating electrical pulses comprising, two branch circuits connected in parallel and individually including a unidirectional conductive device in series with a transmission-line section having a predominantly capacitive terminal impedance at a given operating frequency and having a time delay substantially less than the period of said frequency, said two unidirectional devices being oppositely poled in said circuits, inductive means associated with said branch circuits and providing for each of said line sections a charging circuit, means for applying an alternating potential of said frequency to said charging circuits, switching means for connecting said line sections in series-aiding relation and providing a discharge path therefor, and means responsive to the discharging of said line sections for supplying output pulses to a utilizing device.

4. Apparatus for generating electrical pulses comprising, two branch circuits connected in parallel and individually including a unidirectional conductive device in series with an energy-storage device the terminal impedance of which is predominantly capacitive at a given operating frequency, said two unidirectional devices being oppositely poled in said circuits, inductive means associated with said branch circuits and providing for each of said storage devices a charging circuit, means for applying an alternating potential of said frequency to said charging circuits, switching means for connecting said storage devices in series-aiding relation and providing a discharge path therefor, and means common to one of said branch circuits and to said discharge circuit for supplying output pulses to a utilizing device in response to the discharging of said storage devices.

5. Apparatus for generating electrical pulses comprising, two branch circuits connected in parallel and individually including a unidirectional conductive device in series with an energy-storage device the terminal impedance of which is predominantly capacitive at a given operating frequency, said two unidirectional devices being oppositely poled in said circuits, inductive means comprising a transformer associated with said branch circuits and providing for each of said storage devices a charging circuit, means for applying an alternating potential of said frequency to said charging circuits, switching means for connecting said storage devices in series-aiding relation and providing a discharge path therefor, and means responsive to the discharging of said storage devices for supplying output pulses to a utilizing device.

6. In combination, a load circuit, circuit means for connecting said load circuit to a source of alternating potential, a pair of wave-shaping networks in said circuit means each having capacity for storing energy, means for charging the storage capacity of one of said networks from said source when the potential thereof is in one direction, means for charging the other of said networks from said source when the potential thereof is in the opposite direction, said wave-shaping networks being connected to opposite sides of said load circuit, and a rotary spark gap device for periodically discharging the energy stored in said networks through said load circuit.

7. In combination, a load circuit, circuit means for connecting said load circuit to a source of alternating potential, a pair of wave-shaping networks in said circuit means each having capacity for storing energy, means for charging the storage capacity of one of said networks from said source when the potential thereof is in one direction, means for charging the other of said networks from said source when the potential thereof is in the opposite direction, said wave-shaping networks being connected to opposite sides of said load circuit, and a rotary spark gap device synchronized with said source of alternating potential for periodically discharging the energy stored in said networks through said load circuit.

8. In combination, a load circuit, circuit means for connecting said load circuit to a source of alternating potential, a pair of inversely connected rectifiers interposed in said circuit means, a pair of wave-shaping networks in said circuit means each having capacity for storing energy, one of said wave-shaping networks being connected between one of said rectifiers and one side of said load circuit, and the other of said wave-shaping networks being connected between the other of said rectifiers and the other side of said load circuit, and means for periodically interconnecting the ends of said networks remote from said load circuit.

9. In combination, a load circuit, circuit means for connecting said load circuit to a source of alternating potential, a pair of inversely connected rectifiers interposed in said circuit means, a pair of wave-shaping networks in said circuit means each having capacity for storing energy, one of said wave-shaping networks being connected between one of said rectifiers and one side of said load circuit, and the other of said wave-shaping networks being connected between the other of said rectifiers and the other side of said load circuit, and means synchronized with said source of alternating potential for interconnecting the ends of said networks remote from said load circuit.

10. In combination, a load circuit, circuit means for connecting said load circuit to a source of alternating potential, a pair of inversely connected rectifiers interposed in said circuit means, a pair of wave-shaping networks in said circuit means each having capacity for storing energy, one of said wave-shaping networks being connected between one of said rectifiers and one side of said load circuit, and the other of said wave-shaping networks being connected between the other of said rectifiers and the other side of said load circuit, and a rotary spark gap device for periodically interconnecting the ends of said networks remote from said load circuit.

11. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connecting leads disposed to convey opposite charges to said networks, and means for periodically connecting oppositely charged terminals of said networks together.

12. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connecting leads disposed to convey opposite charges to said networks, and means including a rotary spark gap device for connecting oppositely charged terminals of said networks together.

13. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connecting leads disposed to convey opposite charges to said networks, and means synchronized with said source of alternating potential for connecting oppositely charged terminals of said networks together.

14. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connecting leads disposed to convey opposite charges to said networks, and means including a rotary spark gap device synchronized with said source of alternating potential for connecting oppositely charged terminals of said networks together.

WOLFGANG MICHAEL MICHAELIS.

REFERENCES CITED

The following references are of record in the file of this patent:

FOREIGN PATENTS

| Number | Country | Date |
|---|---|---|
| 579,679 | Great Britain | May 22, 1947 |